US010901613B2

(12) United States Patent
Melnik

(10) Patent No.: US 10,901,613 B2
(45) Date of Patent: *Jan. 26, 2021

(54) NAVIGATING VIRTUAL ENVIRONMENTS

(71) Applicant: Flying Wisdom Studios, San Francisco, CA (US)

(72) Inventor: Jedidiah Melnik, San Francisco, CA (US)

(73) Assignee: Flying Wisdom Studios, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/789,416

(22) Filed: Feb. 12, 2020

(65) Prior Publication Data

US 2020/0183578 A1 Jun. 11, 2020

Related U.S. Application Data

(63) Continuation of application No. 15/063,269, filed on Mar. 7, 2016, now Pat. No. 10,599,325.

(60) Provisional application No. 62/147,091, filed on Apr. 14, 2015.

(51) Int. Cl.
| | | |
|---|---|---|
| G06F 3/048 | (2013.01) | |
| G06F 3/0488 | (2013.01) | |
| G06F 3/01 | (2006.01) | |
| G06F 3/0484 | (2013.01) | |
| A63F 13/2145 | (2014.01) | |
| A63F 13/5255 | (2014.01) | |
| A63F 13/92 | (2014.01) | |
| G06F 3/0485 | (2013.01) | |

(52) U.S. Cl.
CPC ...... *G06F 3/04883* (2013.01); *A63F 13/2145* (2014.09); *A63F 13/5255* (2014.09); *A63F 13/92* (2014.09); *G06F 3/011* (2013.01); *G06F 3/0485* (2013.01); *G06F 3/04842* (2013.01)

(58) Field of Classification Search
CPC .. G06F 3/04883; G06F 3/011; G06F 3/04842; G06F 3/0485; A63F 13/2145; A63F 13/5255; A63F 13/92
See application file for complete search history.

(56) References Cited

U.S. PATENT DOCUMENTS

| | | | |
|---|---|---|---|
| 6,175,801 B1 | 1/2001 | Millington | |
| 8,313,376 B2 * | 11/2012 | Asuke | A63F 13/428 463/36 |
| 8,711,101 B2 * | 4/2014 | Suzuki | G06F 3/0488 345/173 |
| 9,244,590 B1 * | 1/2016 | Browder | G06F 3/04815 |

(Continued)

*Primary Examiner* — Mahelet Shiberou
(74) *Attorney, Agent, or Firm* — Hickman Palermo Becker Bingham LLP

(57) ABSTRACT

Techniques for navigating a virtual environment are provided. A first portion of the virtual environment is displayed on a visual display of a device. The virtual environment comprises multiple portions that includes the first portion. While the first portion is displayed, input that indicates a particular direction is received. In response to receiving the input: (1) a second portion, of the plurality of portions, that is different than the first portion is identified based on the particular direction; (2) the second portion of the virtual environment is displayed on the visual display; and (3) a virtual object that was displayed on the first portion is automatically moved to a position on the second portion.

20 Claims, 4 Drawing Sheets

(56) References Cited

U.S. PATENT DOCUMENTS

| | | | |
|---|---|---|---|
| 2004/0224757 A1* | 11/2004 | Yamamura | A63F 13/10 463/30 |
| 2006/0109259 A1* | 5/2006 | Ohta | G06F 3/0485 345/173 |
| 2006/0258455 A1* | 11/2006 | Kando | A63F 13/2145 463/36 |
| 2006/0267959 A1* | 11/2006 | Goto | G06F 3/0488 345/173 |
| 2009/0303231 A1 | 12/2009 | Robinet | |
| 2010/0214237 A1* | 8/2010 | Echeverri | G06F 3/04883 345/173 |
| 2012/0077585 A1* | 3/2012 | Miyamoto | A63F 13/25 463/31 |
| 2014/0221092 A1 | 8/2014 | Manton | |
| 2015/0094127 A1 | 4/2015 | Canose | |
| 2015/0355796 A1 | 12/2015 | Iwasaki | |
| 2016/0184699 A1* | 6/2016 | Rageh | A63F 13/525 463/33 |

\* cited by examiner

NAVIGATING VIRTUAL ENVIRONMENTS

CROSS-REFERENCE TO RELATED APPLICATIONS; BENEFIT CLAIM

This application claims the benefit as a Continuation of U.S. application Ser. No. 15/063,269, filed Mar. 7, 2016; which claims the benefit of U.S. Provisional Application No. 62/147,091, filed Apr. 14, 2015, the entire contents of each of which are hereby incorporated by reference as if fully set forth herein, under 35 U.S.C. § 120. The applicant hereby rescinds any disclaimer of claim scope in the parent application or the prosecution history thereof and advise the USPTO that the claims in this application may be broader than any claim in the parent application.

TECHNICAL FIELD

The present disclosure relates to electronic gaming and, more particularly to, navigating a virtual environment using a mobile device.

BACKGROUND

Some electronic games involve relatively large virtual worlds or environments in which a player's character is able to move. However, the size of the virtual environment is larger than what can be displayed on a screen of a computing device, such as a mobile device. If the entire virtual environment is displayed at once, then interesting detail would be lost and the player would lose interest.

Current approaches to allowing a user to move a character in an electronic game environment focuses on the character itself. Inputs to control a character's movement typically involve up, down, left, and/or right. Regardless of the input, the player remains at the center of a computer screen. In other words, the game "camera" (or view of the game environment) follows the character's movement in order to keep the character centered on the computer screen. If the character is at the "edge" of the game environment and the current view is not desired, then the character will have to move in another direction.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A method and system are provided for navigating a virtual game environment. While a portion of the virtual game environment is displayed, a user provides input comprising one or more swipes on a touchscreen of a mobile device. The one or more swipes are detected movements in a particular direction. Based on the particular direction, the view of the virtual game environment changes, after which a virtual object, such as a human character, is automatically moved to the currently-presented view of the environment.

Process Overview

Figure 1:
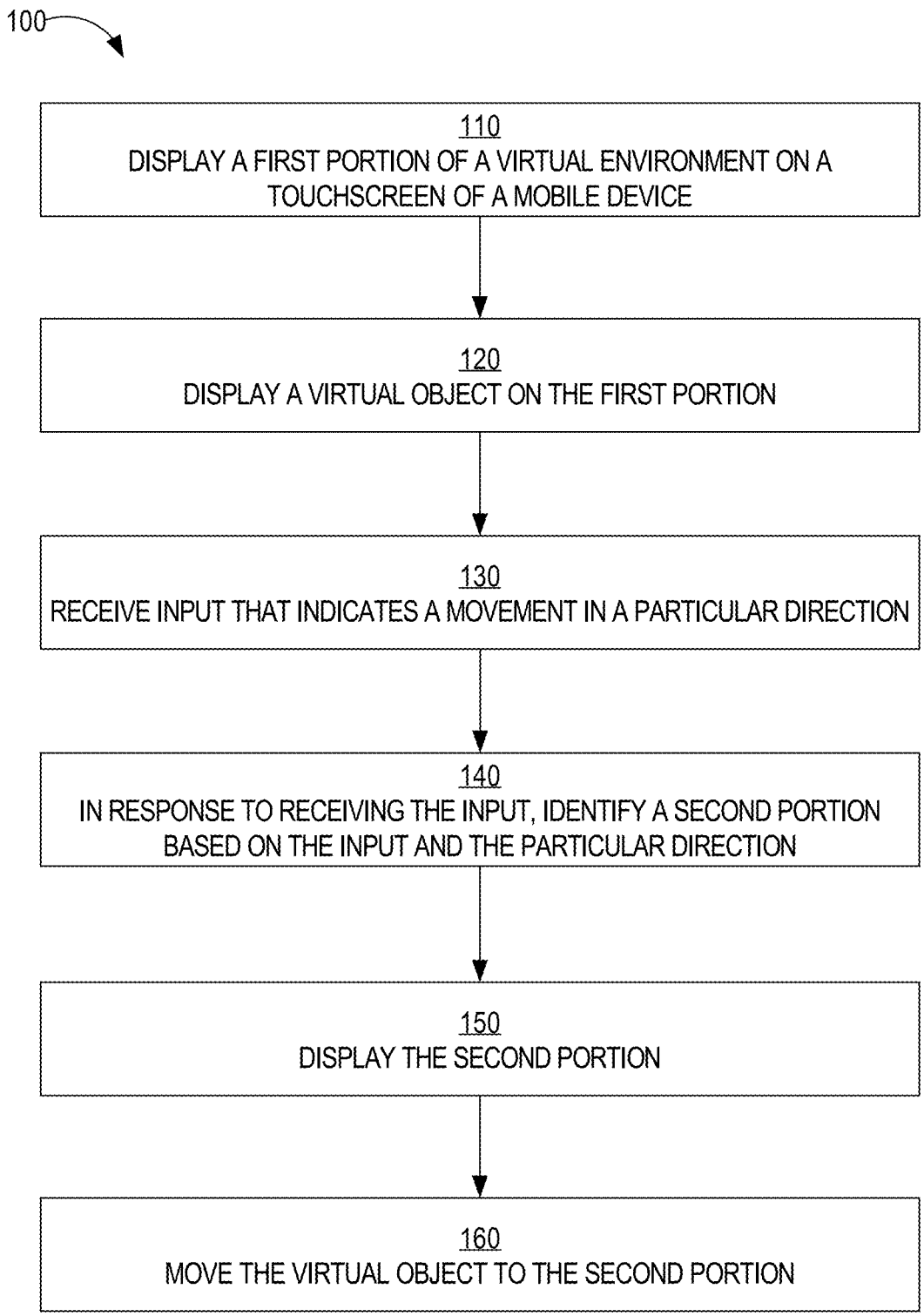
FIG. 1 is a flow diagram that depicts a process for navigating a virtual game environment, in an embodiment.

FIG. 1 is a flow diagram that depicts a process 100 for navigating a virtual game environment, in an embodiment. Process 100 may be implemented by software executing on a single mobile device, such as a tablet computer, a laptop computer, or a smartphone. Thus, the software may be a client application that is downloaded for an online application or game store. The client application may be configured to communicate with a server over a network for certain content, but might not be required to do so in order to play the game or some version thereof. Alternatively, process 100 may be implemented by software executing on a mobile device and a server to which the mobile device is communicatively coupled over a network, such as a LAN, WAN, or the Internet. The server may provide content that the client application requests and that is needed by the client application in order to present the game properly.

Additionally or alternatively, process 100 is implemented on touch devices, mouse driven devices, camera captured gestural control devices, gestural devices that use radio tracking systems similar to those seen in the more recent virtual reality (VR) gloves, or any future input interface control system where users/players indicate their intention to move through a virtual environment.

At block 110, a first portion of the virtual game environment is displayed on a touchscreen of the mobile device. The VGE comprises multiple portions, each of which may or may not overlap with each other. Each portion is referred to herein as an "acre." An acre may be two-dimensional or three-dimensional. An acre may be square or rectangle. In an embodiment, an acre is a predetermined, discrete area of terrain.

A virtual game environment may involve one or more types of terrains, such as a desert terrain, a forest terrain, a mountain terrain, a grassy terrain, a rocky terrain, or outer space. A single acre may cover one or more types of terrains.

In an embodiment, a user of the mobile device is allowed to view an acre from multiple angles, such as a view directly overhead, a view from "ground" level, or practically every other possible view from another angle.

At block 120, while the first acre is displayed, a virtual object that is under control of a user of the mobile device is displayed. The virtual object is referred to hereinafter as a "character." The character may have human attributes (e.g., head, arms, legs, etc.), animal attributes (e.g., of a tiger), plant attributes (e.g., of a tree) or any other type of creature, real or imagined. The user may control the character through any input means, such as through the touchscreen, one or more keys of a keyboard (graphical or physical), or voice commands (e.g., "left," "right," "up," "back," "down," "forward").

At block 130, input that comprises a swipe in a particular direction is received through, for example, the touchscreen. A swipe involves a finger (or stylus) of the user touching a location on the first acre and, while the finger is touching the touchscreen, the finger moves in the particular direction relative to the top of the touchscreen. For example, the particular direction may be from left to right, right to left, up to down, or down to up. A swipe may end when the finger (or stylus) is lifted so that it no longer touches the touchscreen.

At block 140, in response to receiving the input, a second acre of the VGE is identified based on the input and the particular direction. Block 140 may involve determining an acre that is adjacent to the first acre (or the currently displayed acre) and that is in the opposite direction of the particular direction. For example, if the swipe is from left to right, then the second acre that is identified is to the left of the first acre. Alternatively, if the swipe is from left to right, then the second acre that is identified is to the right of the first acre.

At block 150, the second acre is displayed. Blocks 130-150 may be performed with or without transition effects. For example, once the second acre is identified, the first acre disappears and the second acre appears, seemingly simultaneously.

At block 160, the character is moved to the second acre automatically. The character may be moved to the center of the second acre. Alternatively, the character may be moved to a location (e.g., lower left-hand corner) on the second acre that corresponds to the location (e.g., lower left-hand corner) on the first acre.

Alternatively, the character may be moved to an edge or border of the second acre and the x or y coordinate stays the same. For example, if the character is in the center of the first acre and the x, y coordinates of the center location are (50, 50) and the swipe is from right to left, then the (e.g., center of the) character may appear at (0, 50) or somewhere near there, such as (5, 50). If the center of the character is at (0, 50), then a portion of the character may not appear on the screen. As another example, if the character is in the center of the first acre and the x, y coordinates of the center location are (50, 50) and the swipe is from up to down, then the (e.g., center of the) character may appear at (50, 0) or somewhere near there, such as (50, 5).

In an embodiment, a user is allowed to navigate to acres that are diagonal relative to the current acre. For example, a particular rectangle acre may be surrounded by eight acres, where four of the surrounding acres touch the particular acre only at one of the corners of the particular acre. Thus, the touchscreen detects whether the swipe is at a particular angle relative to an x-axis (passing left to right through the center of the screen) or y-axis (passing up and down through the center of the screen). If, for example, the detected angle is 45 degrees (or within a certain range, such as 35-55), then the acre touching the bottom-left corner of the currently displayed acre is identified and displayed. If, for example, the detected angle is 225 degrees (or within a certain range, such as 215-235), then the acre touching the top-right corner of the currently displayed acre is identified and displayed.

Figure 2:
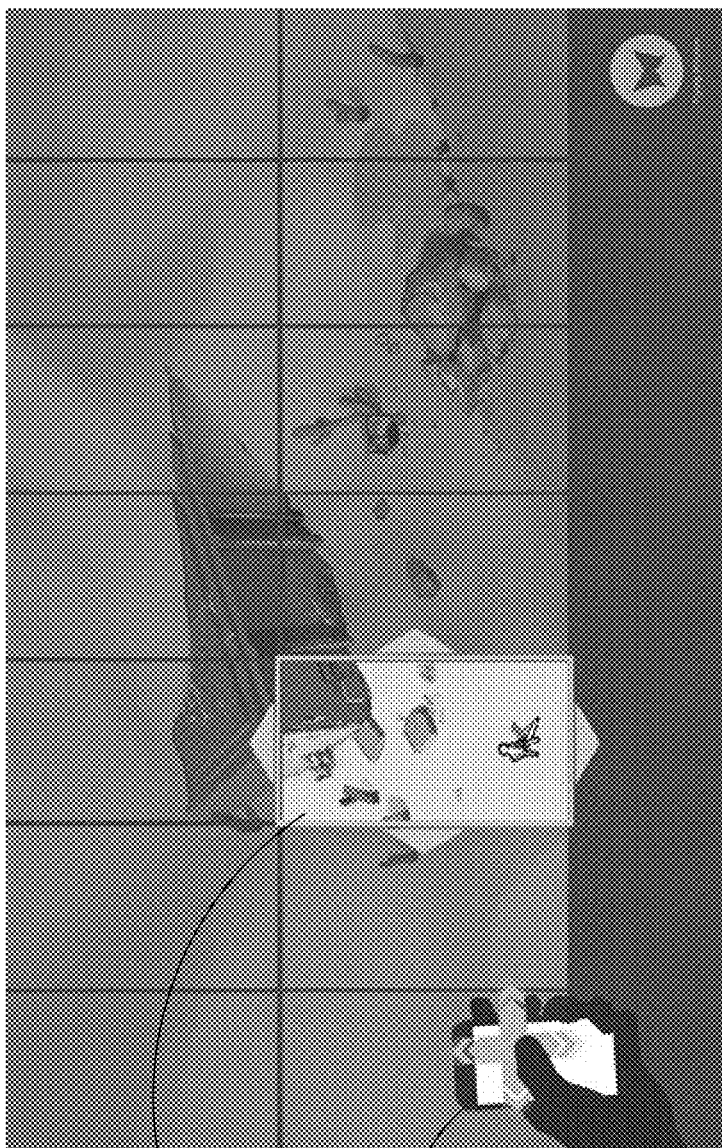
FIG. 2 is a diagram depicting multiple acres of a VGE, in an embodiment.

FIG. 2 is a diagram depicting multiple acres of a VGE 200, in an embodiment. VGE 200 may include more acres than are depicted in FIG. 2. FIG. 2 also shows a mobile device 220 and a person's hand superimposed on VGE 200. VGE 200 includes an acre 210 that is currently displayed on a mobile device. The areas adjacent to acre 210 indicate in which directions a user may swipe. In this example, a user may swipe up, down, left, or right. However, in another embodiment, as described above, a user may swipe in a diagonal direction so that at least two more acres (to the top left and the top right) may be navigated to in a single swipe.

In this example, acre 210 may be an "edge" acre in VGE 200. Thus, a user may not navigate "down" relative to acre 210. If a user does attempt to swipe down (or up if the acre that is attempted to be reached is in the opposite direction of the input), then feedback may be generated, such as an audible sound, a vibration of the mobile device, or a visual indication. The feedback indicates that the user is unable to move his character to the indicated acre.

A VGE in which a character may navigate (e.g., VGE 200) may be one of multiple VGEs within a single game. For example, a first VGE of a particular game may correspond to one region/world/kingdom/level of the particular game and a second VGE of the particular game may correspond to another region/world/kingdom/level of the particular game.

Displaying a Destination Acre

In an embodiment, once a destination acre is determined, a character (or, optionally, multiple characters if multiple characters exists) is moved automatically to the destination acre and the destination acre is displayed.

In an alternative embodiment, after a destination acre is determined and displayed, the character is not moved to the destination acre unless the user provides additional input, such as a tap on a touchscreen or a specific verbal command. Without the additional input, the character is not moved to the destination acre. In order to return to the current (or "starting") acre, one of two approaches may be used. In one approach, the user must provide explicit input to return to the current acre. For example, if the user provided two swipes to the right, then the user provides two swipes to the left to return to the current acre. As another example, the user provides other input (other than one or more swipes) that signals a desire to view the current acre. In another approach, the current acre is automatically presented on the screen of the user's computing device after a certain amount of time (e.g., 2 seconds) without input from the user. Thus, if the destination acre is displayed for 2 seconds without the user providing any additional input (or without providing certain input, such as a tap), then the current acre is automatically displayed.

Movement within an Acre

Figure 3:
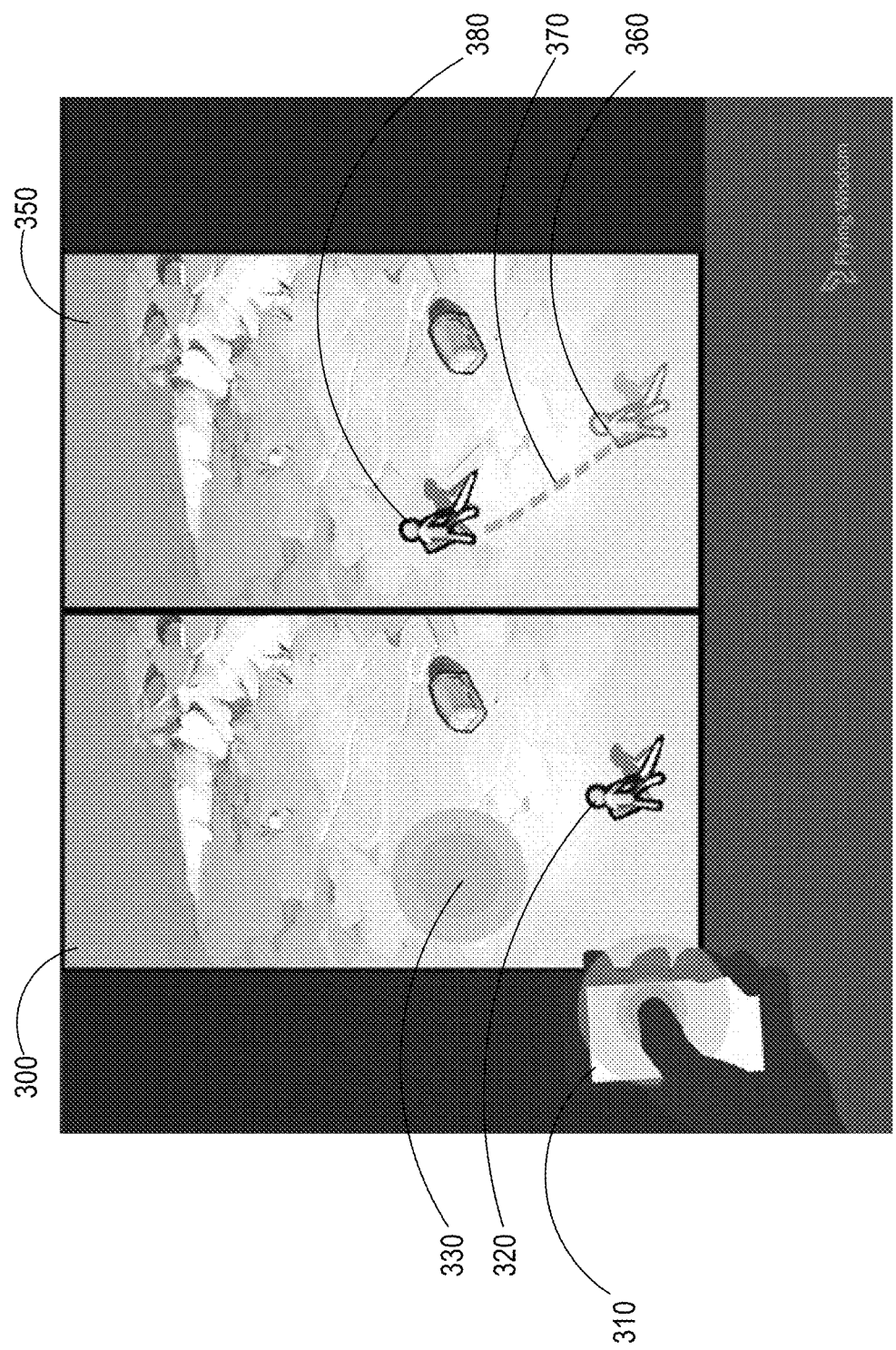
FIG. 3 is a diagram that depicts two instances of an acre, one before input and one after the input, in an embodiment.

In an embodiment, a user provides a single piece of input to cause a character to move from a current (or "source") location in an acre to another (or "destination") location in the acre. Such input may be a single tap of a finger or stylus on a position, of the touchscreen, that corresponds to the destination location. FIG. 3 is a diagram that depicts two instances (300 and 350) of an acre, one before input and one after the input, in an embodiment. FIG. 3 also shows a mobile device 310 and a person's hand adjacent to acre 300. Acre 300 includes a character 320 that a user is able to control through one or more control inputs. In this example, the user presses her thumb at location 330 of acre 300. In response, the character moves to that location. The movement may be instantaneous. Alternatively, the character may be displayed as moving along a path 370 until the character arrives at the location. Character 380 in acre 350 shows the final result of the intra-acre movement. Character 360 is grayed to indicate the position that the character held when the input was received relative to location 330. Character 360 and/or path 370 may be displayed.

In this depicted example, between instances 300 and 350 of the acre, the view of the VGE remains the same. Only the character moves and any other artifacts related to the move (e.g., character 360 and/or path 370) may be displayed.

In a related embodiment, additional instances 300 and 350 of the acre are displayed. The additional instances may be intermediate states, such as the character appearing at a certain position along path 370, which may or may not be displayed.

Obstacles

In an embodiment, a VGE includes one or more obstacles. An obstacle may take any visual form, such as a wall, a mountain, a forest, a boulder, or a building. An obstacle prevents a character from moving along a path that passes through the obstacle. In order to navigate from one side of an obstacle to the opposite side of the obstacle, the character will have to move around the obstacle, which may require multiple inputs.

Given the example in FIG. 3, if an obstacle exists between character 320 and location 330, then the character may take a different path to location 300, such as "walking" around the obstacle, "jumping" over the obstacle, or "flying" over the obstacle.

An obstacle may cover only a small portion of an acre, such that a character may navigate around the obstacle without leaving the acre. Alternatively, an obstacle may cover an entire acre or an entire side of an acre, such that a character might have to navigate to one or more other acres in order to arrive at the opposite side (relative to the current position of the character) of the obstacle If a user provides input (e.g., a finger swipe) to navigate from one acre (the "current acre") to another acre (the "destination acre"), it may be determined that an obstacle resides between the current acre and the destination acre. For example, an impenetrable wall may reside between the current acre and the destination acre. One or more possible options may be implemented. In one option, the character is able to move to the destination acre as if no obstacle exists. In another option, the view of the VGE does not change in response to receiving the input or the view changes slightly to show the obstacle and a portion of the destination acre. A "bounce back" effect may be displayed such that the view refocuses on the current acre after moving slightly or partially over the destination acre. Such a bounce back effect indicates that movement to the destination acre is not allowed. In another option, the destination acre is displayed in place of the current acre but the character does not appear in the destination acre. Instead, output is provided that indicates that the character is unable to arrive at the destination acre. The output may be visual (e.g., temporarily displaying a red hue over or around the destination acre), auditory (e.g., a short buzzing sound), textual (e.g., "NAVIGATION PROHIBITED"), or any combination thereof.

In an embodiment, an obstacle is a particular acre itself such that a character is not allowed to enter the particular acre without performing some action or the user is not allowed to view the particular acre without performing some action (e.g., as making a purchase, entering a passcode, or providing input to cause the character to perform a combination of moves or actions). In this embodiment, the character is denied entrance to the particular acre, at least temporarily.

Chain Navigation

In an embodiment, a user may traverse multiple acres with a series of inputs, such as multiple finger swipes. In this way, a user may navigate to many possible destination acres relatively quickly. This technique is referred to as "chain navigation." For example, if a user provides three distinct swipes from left to right in relatively short succession (e.g., each swipe within a half second of each other), then the destination acre is determined to be three acres to the left of the current acre (or three acres to the right of the current acre, depending on the implementation).

In a related embodiment, some of the swipes may be in different directions, such as a bottom-to-top swipe, a left-to-right swipe, and another bottom-to-top swipe. The destination acre may be determined to be, relative to the current acre, down two acres and one acre to the left.

In either embodiment, the acres between the current acre and the destination acre (herein "intermediate acres") may or may not be shown. If an intermediate acre is shown, then the intermediate acre may be shown only as long as it takes to process the next input (e.g., swipe). Additionally or alternatively, an intermediate acre may be displayed differently than the current acre or a soon-to-be-displayed destination acre. For example, an intermediate acre may be grayed, indicating that the destination acre is not yet displayed.

Zoom Navigation

In an embodiment, a user is able to view a map of a VGE and select one of multiple acres indicated on the map. In this way, a user may navigate to practically any acre in a VGE with two or three inputs. This technique is referred to as "zoom navigation." A user provides input that indicates a map is requested. The input may be voice input, keyboard input (e.g., a combination of keys), or a type of finger swipe (e.g., in the form of an alpha sign). In response to detecting the input, a map of the VGE is displayed. The map may use up the entire space on the touchscreen or may only require a portion of the touchscreen space, leaving another portion to display portions of the current acre. The map may indicate where the character is located in the VGE and may indicate other information, such as where other characters (e.g., controlled by the same user or different users) are located in the VGE, where certain obstacles are located, etc. The map may also be divided into acres, such that the border of each acre is visually discernable to the user. Also, the map may indicate that some acres or some areas of the VGE are in accessible through one or more visual indications.

Once the map is displayed, a user that provides input relative to a location of the map (e.g., a finger touching an area on the touchscreen that corresponds to the location) will cause an acre that corresponds to the location to be displayed. Thus, in this example, only two inputs are required to select a destination acre. Zoom navigation may be preferable over chain navigation if the user desires to move a character more than two or three acres away from the current acre.

Obstacles in Chain and Zoom Navigation

In some situations, one or more obstacle may exist in a VGE between a character in a current acre and the destination acre (whether determined through chain navigation or zoom navigation). In an embodiment, an intermediate acre in which such an obstacle exists is displayed instead of the destination acre. In this way, the user must figure out how to arrive at the destination acre a different way, such as navigating one acre at a time, or determine to perform some other action, such as navigating to a different destination acre or leaving the VGE altogether.

In another embodiment, instead of displaying the intermediate acre in which an obstacle exists and prevents a character from moving to the destination acre, an acre immediately preceding that intermediate acre in the path from the current acre to the destination acre is displayed. From there, the user must determine how to navigate to the destination acre a different way, navigate to a different destination acre, or perform a different action altogether.

Timing of Character Movement

In an embodiment, as soon as a destination acre is determined and displayed on the touchscreen, the character is displayed as well. In this embodiment, the character appears simultaneously with the destination acre. This is referred to herein as the "immediate character appearance setting."

In an alternative embodiment, the distance of a destination acre from a current acre dictates how long it takes for the character to appear at the destination acre. This is referred to as the "variable time setting." For example, if it takes two seconds for a character to move from a current acre to an adjacent acre, then it may take four seconds for the character to move from the current acre to a destination acre where a single intermediate acre exists between the two acres. Thus, while the destination acre is displayed, the character is not immediately displayed on the touchscreen; rather, the character appears some time later. The length of time and its relationship to the number of acres between the current location and the destination acre may be tunable.

In a related embodiment, the time it takes for a character to appear at a destination acre is constant regardless of how many intermediate acres there exists between the current acre and the destination acre. This is referred to herein as the "constant time setting."

In an embodiment, a user is able to select one of multiple settings that include two or more of (1) the immediate character appearance setting, (2) the variable time setting, or (3) the constant time setting.

Continuous Acres

In an embodiment, a user is able to scroll through a VGE continuously. Thus, a view of a VGE may change one or a few pixels at a time. Thus, a VGE may be viewed has having a virtually unlimited number of "continuous" acres, where one acre includes portions of (or overlaps) many other acres. The speed through which a user may scroll through or view a VGE may vary based on the input. For example, the faster the finger swipe, the more quickly the view of a VGE changes. As another example, the faster the finger swipe, the more the view changes even after the finger is lifted from the touchscreen. As soon as the user's finger leaves the touchscreen (or soon thereafter), the speed with which the view changes decreases until the view settles on a particular portion of the VGE (unless a border of the VGE is reached first).

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
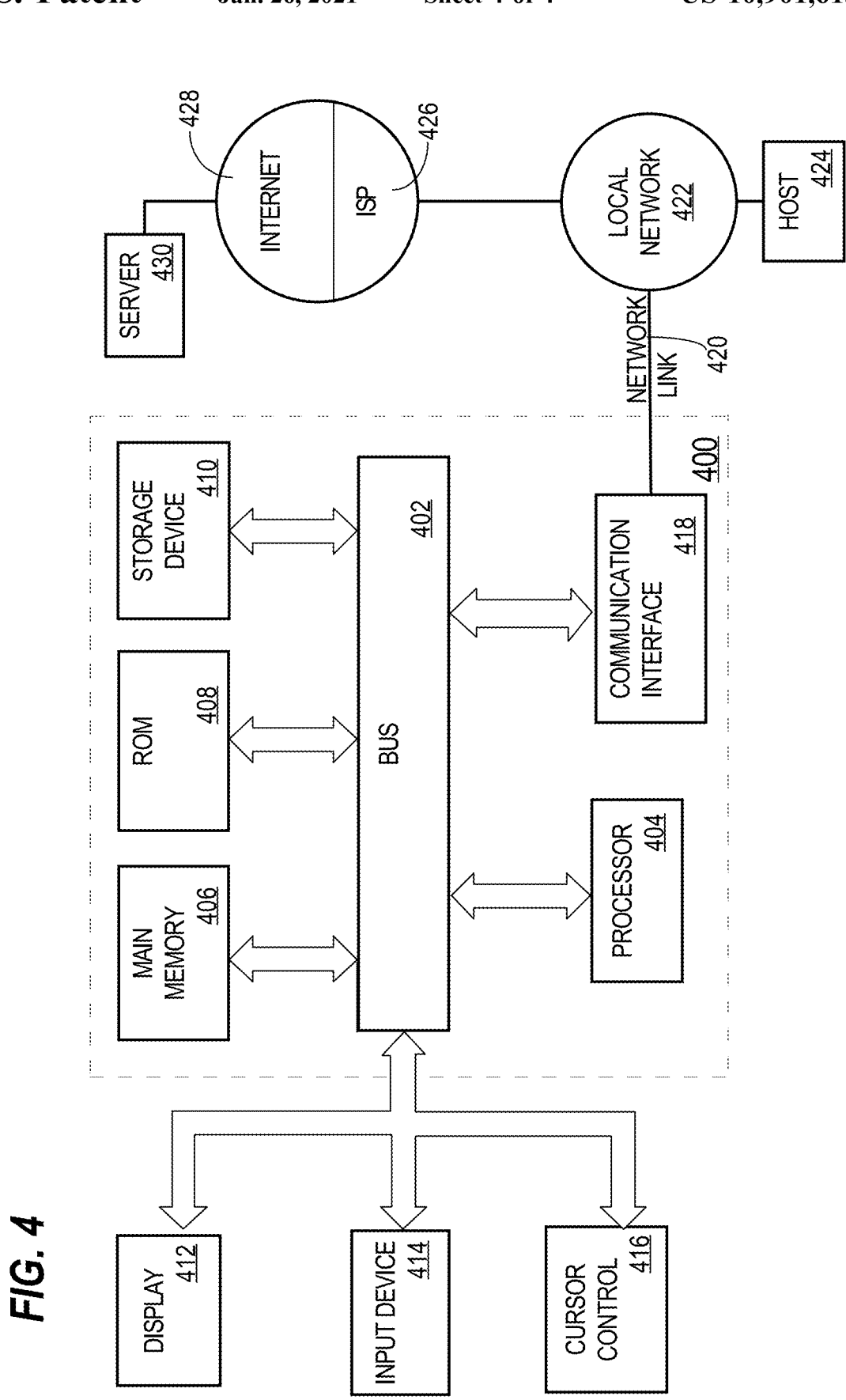
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hardwired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising of traversing a multi-dimensional virtual environment displayed through a visual display of a device, the method comprising:
   displaying, on the visual display of the device, a first portion of the virtual environment that comprises a plurality of portions that includes the first portion;
   while the first portion is displayed and not any of the other portions of the plurality of portions:
      displaying, at a first location on the first portion, a virtual object that is under control of a user of the device;
      receiving input that comprises a plurality of user inputs indicating one or more directions;
   in response to receiving the input that comprises the plurality of user inputs indicating the one or more directions:
      determining a number of user inputs in the plurality of user inputs;
      identifying, based on the number of user inputs and a direction of each user input of the plurality of user inputs, a second portion of the plurality of portions, wherein the second portion is different than the first portion is not adjacent to the first portion;
      displaying, on the visual display, the second portion of the virtual environment;
      moving the virtual object to a position on the second portion;
   wherein the method is performed by one or more computing devices.

2. The method of claim 1, wherein the input is second input, the method further comprising, prior to receiving the second input:
   while displaying the first portion and the virtual object at the first location:
      receiving first input that indicates a second location, on the first portion, that is different than the first location;
      in response to receiving the first input, causing the virtual object to move from the first location to the second location on the first portion.

3. The method of claim 1, wherein the direction of each user input is, relative to the top of the visual display, left, right, up, down, or one of four diagonal directions.

4. The method of claim 1, wherein input comprises a finger of the user touching a second location on the first portion and, while the finger is touching the visual display, the finger moves in a particular direction relative to the top of the visual display.

5. The method of claim 1, wherein the second portion does not overlap the first portion.

6. The method of claim 1, further comprising, in response to receiving the input:
    determining whether a virtual obstacle exists between the first portion and the second portion;
    moving the virtual object to the position on the second portion only in response to determining that a virtual obstacle does not exist between the first portion and the second portion.

7. The method of claim 6, wherein the virtual obstacle comprises a wall, a mountain, or a building.

8. The method of claim 1, wherein, prior to displaying the second portion, one or more intermediate portions that are between the second portion and the first portion either are not displayed or are displayed differently than the second portion and first portion.

9. The method of claim 1, wherein while the second portion is displayed, the virtual object is not displayed, the method further comprising:
    determining a virtual distance between the second portion and the first portion;
    determining, based on the virtual distance between the second portion and the first portion, a time to cause the virtual object to reappear on the visual display;
    based on the time, causing the virtual object to reappear on the visual display at the position on the second point.

10. The method of claim 1, wherein the plurality of user inputs includes (1) a first user input indicating a first direction and (2) a second user input indicating a second direction that is different than the first direction.

11. The method of claim 10, wherein the first direction is on an x-axis and the second direction is on a y-axis.

12. The method of claim 1, wherein:
    a view of the virtual environment changes in proportion to a determined length of the movement;
    the second portion overlaps the first portion.

13. A method of traversing, on a device, a multi-dimensional virtual environment that comprises a plurality of portions, the method comprising:
    displaying, on a visual display of the device, a first portion of the plurality of portions without displaying any other portion of the plurality of portions;
    while the first portion is displayed,
        displaying, on the first portion, a virtual object that is under control of a user of the device;
        receiving first input;
    in response to receiving the first input, displaying a map, of the virtual environment, that indicates the plurality of portions;
    while displaying the map, receiving second input relative to the map, wherein the second input selects a second portion of the plurality of portions;
    in response to receiving the second input:
        identifying, based on the second input, the second portion, of the plurality of portions, that is different than the first portion and that is not adjacent to the first portion in the virtual environment;
        displaying, on the visual display, the second portion of the virtual environment without displaying the first portion;
        moving the virtual object to a position on the second portion;
    wherein the method is performed by one or more computing devices.

14. The method of claim 13, wherein:
    the second input is relative to a particular location on the visual display;
    the particular location corresponds to the second portion.

15. The method of claim 13, wherein the map includes, for each portion of the plurality of portions, a boundary that separates said each portion from each portion that is adjacent to said each portion.

16. The method of claim 13, wherein the map covers less than the entire portion of the visual display.

17. The method of claim 13, further comprising, while displaying the map, highlighting the first portion or a location on the map where the virtual object is located in the virtual environment.

18. The method of claim 13, wherein:
    displaying the first portion when the first input is received comprises displaying the first portion with a first brightness level;
    displaying the map comprises displaying the map in a foreground and the first portion in a background with a second brightness level that is less than the first brightness level.

19. One or more non-transitory storage media storing instruction for traversing a multi-dimensional virtual environment on a mobile device, wherein the instructions, when executed by the one or more processors, cause:
    displaying, on the visual display of the device, a first portion of the virtual environment that comprises a plurality of portions that includes the first portion;
    while the first portion is displayed and not any of the other portions of the plurality of portions:
        displaying, at a first location on the first portion, a virtual object that is under control of a user of the device;
        receiving input that comprises a plurality of user inputs indicating one or more directions;
    in response to receiving the input that comprises the plurality of user inputs indicating the one or more directions:
        determining a number of user inputs in the plurality of user inputs;
        identifying, based on the number of user inputs and a direction of each user input of the plurality of user inputs, a second portion of the plurality of portions, wherein the second portion is different than the first portion is not adjacent to the first portion;
        displaying, on the visual display, the second portion of the virtual environment;
        moving the virtual object to a position on the second portion.

20. The one or more non-transitory storage media of claim 19, wherein the plurality of user inputs includes (1) a first user input indicating a first direction and (2) a second user input indicating a second direction that is different than the first direction.

* * * * *